US008613019B2

(12) United States Patent
Kinder et al.

(10) Patent No.: US 8,613,019 B2
(45) Date of Patent: Dec. 17, 2013

(54) PROVIDING A VIEWER INCENTIVE WITH VIDEO CONTENT

(75) Inventors: David B. Kinder, Portland, OR (US); Amanda C. Mallare, Aloha, OR (US); Scott P. Casey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 13/291,300

(22) Filed: Nov. 8, 2011

(65) Prior Publication Data

US 2012/0054786 A1    Mar. 1, 2012

Related U.S. Application Data

(63) Continuation of application No. 09/515,272, filed on Feb. 29, 2000, now abandoned.

(51) Int. Cl.
| | | |
|---|---|---|
| *H04N 7/10* | (2006.01) | |
| *H04H 60/32* | (2008.01) | |
| *G06Q 30/00* | (2012.01) | |
| *H04H 60/33* | (2008.01) | |

(52) U.S. Cl.
USPC ............ 725/40; 725/14; 725/5; 705/14.1

(58) Field of Classification Search
USPC .............. 725/5, 9, 37, 40; 705/14.1
See application file for complete search history.

(56) References Cited

U.S. PATENT DOCUMENTS

| 5,135,399 | A | * | 8/1992 | Ryan ........................ 434/236 |
|---|---|---|---|---|
| 5,287,181 | A | | 2/1994 | Holman |
| 5,604,542 | A | | 2/1997 | Dedrick |
| 5,643,088 | A | * | 7/1997 | Vaughn et al. ............... 463/40 |
| 6,002,393 | A | | 12/1999 | Hite |
| 6,057,872 | A | | 5/2000 | Candelore |
| 6,109,925 | A | * | 8/2000 | Druckman et al. .......... 434/236 |
| 6,206,700 | B1 | * | 3/2001 | Brown et al. ................ 434/116 |
| 6,486,895 | B1 | | 11/2002 | Robertson |
| 6,681,393 | B1 | | 1/2004 | Bauminger |
| 7,574,649 | B1 | * | 8/2009 | Safars et al. ................. 715/200 |
| 7,865,405 | B2 | * | 1/2011 | Hendricks et al. ........... 705/27.1 |

(Continued)

FOREIGN PATENT DOCUMENTS

| AU | 775716 | 8/2005 |
|---|---|---|
| DE | 10195792 | 12/2006 |

(Continued)

OTHER PUBLICATIONS

Advanced Television Enhancement Forum Specification (ATVEF), Comment Draft Version 1. Or1, Feb. 25, 1999, Advanced Television Enhancement Forum Specification (ATVEF) Online, Feb. 25, 1999, XP002142688, Retrieved From the Internet: URL:http://www.intercast.org/atvef_spec/TVE-public.htm, Retrieved on Aug. 1, 2001 (24 Pgs. total).

(Continued)

*Primary Examiner* — James R Sheleheda
(74) *Attorney, Agent, or Firm* — Trop, Pruner & Hu, P.C.

(57) ABSTRACT

Video content may be transmitted with enhanced content or ancillary information that includes viewer loyalty incentives. The viewer loyalty incentives may be in the form of incentives, certificates or other information which may accumulate depending on viewing time. The more the viewer watches, the more incentives the viewer may receive.

30 Claims, 5 Drawing Sheets

(56) References Cited

U.S. PATENT DOCUMENTS

2001/0041330 A1   11/2001  Brown
2002/0056112 A1*  5/2002  Dureau et al. ................. 725/78
2009/0138342 A1*  5/2009  Otto et al. ..................... 705/11
2011/0067045 A1*  3/2011  Matheny et al. ............... 725/13

FOREIGN PATENT DOCUMENTS

| HK | 1050793 | 7/2003 |
| --- | --- | --- |
| SG | 90543 | 12/2004 |
| WO | 98/53611 | 11/1998 |
| WO | 01/65841 | 1/2001 |

OTHER PUBLICATIONS

U.S. Appl. No. 09/515,272 entitled: "Providing a Viewer Incentive with Video Content" filed Feb. 29, 2000, 25 pgs.

U.S. Appl. No. 09/515,272 entitled: "Providing a Viewer Incentive with Video Content"—Reply Brief.

Patent Cooperation Treaty Notification of Transmittal of the International Preliminary Examination Report mailed May 22, 2002 in international application No. PCT/US01/02695.

* cited by examiner

PROVIDING A VIEWER INCENTIVE WITH VIDEO CONTENT

CROSS-REFERENCE TO RELATED APPLICATIONS

This application is a continuation of U.S. patent application Ser. No. 09/515,272, filed on Feb. 29, 2000 now abandoned.

BACKGROUND

This invention relates to communicating ancillary information associated with a plurality of audio/video programs, such as television content associated with a plurality of channels.

Ancillary information, such as program subtitles, emergency messages, closed caption messages and program guide information, may be transmitted with regular television content. Other types of ancillary information that may be sent with television content includes enhancement data such as web pages, multimedia information or other digital data files. Ancillary information may be sent during the vertical blanking interval (VBI) of an analog television broadcast signal. Alternatively, the ancillary information may be sent with digital television content over a digital transport medium.

Various standards exist that provide for transmission of ancillary information with television content. One standard is the Advanced Television Enhancement Forum (ATVEF) Specification, Draft 1.1r.26, dated Feb. 2, 1999. The ATVEF Specification provides for transmission of enhancement data along with television content in both analog and digital systems, such as cable systems, satellite systems, terrestrial systems, and so forth. The combination of enhancement data and the television content may be referred to as enhanced television content.

Enhanced television content provides more information options to viewers. For example, a viewer may be presented with the option of viewing advertisements, educational information and so forth while watching regular television programming.

With more competition, television providers are increasingly interested in ways to increase viewer loyalty. Commonly, viewers may surf between different channels switching from program to program. Particularly, during the transmission of commercials, viewers may try other channels or may leave temporarily. This decreases the effectiveness of the commercials and therefore diminishes the desirability of the television content to advertisers. This ultimately means that, increasingly, broadcasting cost may ultimately be borne by the viewer in terms of pay or pay-per-view television.

Thus, there is a need for better ways to increase the viewer loyalty of viewers of video programming.

DETAILED DESCRIPTION

Figure 1:
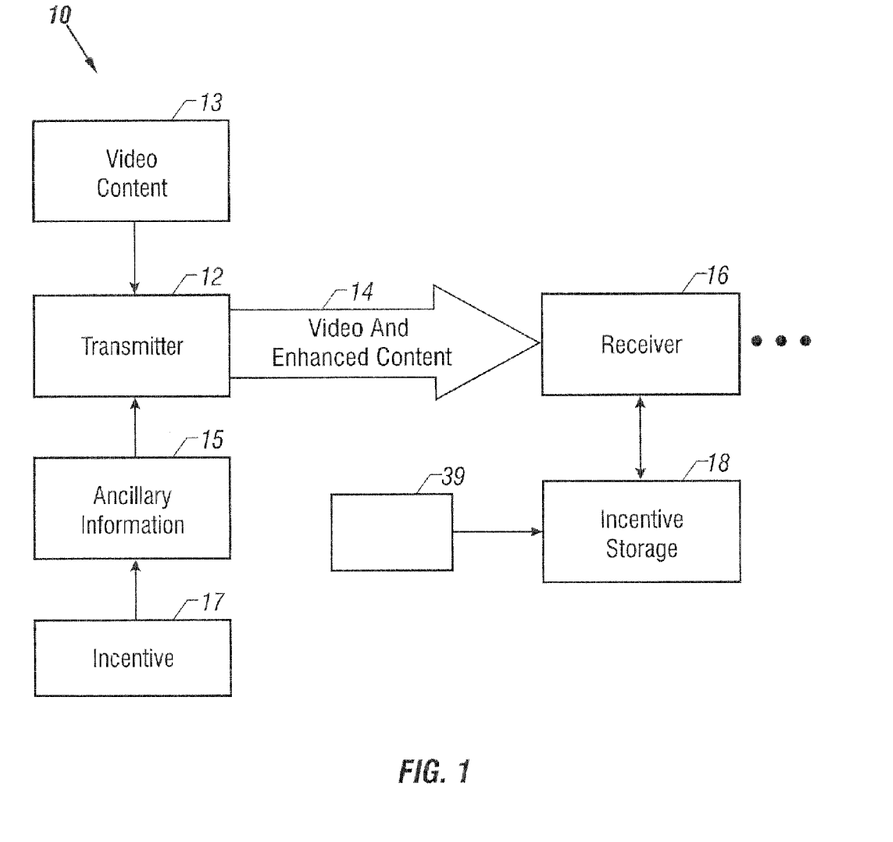
FIG. 1 is a schematic depiction of a system for broadcasting television content together with viewer incentives.

Referring to FIG. 1, an information delivery system 10 according to one embodiment of the present invention includes a content creator or transmitter 12, a transport system 14 and a plurality of receivers 16. The receivers 16 may be located in a variety of distributed sites. The content creator or transmitter 12 originates enhancement data 15 (or other type of ancillary information) and television content 13 (or other types of content including audio and/or video data) to be transmitted by the transport system 14.

Alternatively, the transmitter 12 may create enhancement data with television content provided by another source to the system 14. Enhancement data may include graphics (e.g., web pages, multimedia information or other digital data files), presentation layouts and synchronization information. The combination of enhancement data and television content is referred to as enhanced television content.

The transport operator system 14 provides an enhanced television content delivery infrastructure that may include terrestrial, cable, satellite or other types of transmission facilities (either analog or digital). Enhanced television content may be transmitted over a transport medium that may be a terrestrial, cable, satellite or other type of link to the receiver 16. The receiver 16 may be a television, set-top box, personal computer or other types of processor-based systems adapted to receive television content and associated enhancement data.

As used in this description, the term audio/video (A/V) content is intended to include any type of audio and/or video data and may be transmitted and distributed to one or more receiving sites for presentation to viewers and/or listeners. As used here, A/V content may refer to content that may include both an audio and a video portion or one or more audio or video portions. Further, ancillary information other than enhancement data may be transmitted with the A/V content. For example, ancillary information may include program subtitles, emergency messages, closed caption messages and program guide information.

Thus, the transport stream may contain audio, video and data such as ancillary information, all tightly associated with a single transport stream program. Alternatively, the A/V content may be transmitted separately from but in association with the ancillary information. When the user tunes to the transport stream program, the receiving device can determine the associated audio, video and data, for example because they are all marked as being part of the same program.

One standard for describing transmission of enhancement data with television content is the ATVEF Specification. The enhancement data may be transmitted in a number of different ways from the transport operator system 14 to the receiver 16, depending on the type of transport medium utilized. For example, with an analog transport medium such as the National Television System Committee (NTSC) Standard of the Electronics Industries Association, portions of the enhancement data may be sent to the vertical blanking interval (VBI) of the NTSC transmission. A description of NTSC may be found the book "Video Demystified: A Handbook for the Digital Engineer" by Keith Jack, published High Text Publication (2d, Ed. 1996). Other types of transport media (analog or digital) may provide different mechanisms of communicating the enhancement data.

The enhancement data according to the ATVEF Specification may include enhancements each having the following components: a ATVEF announcement, a resource and a trigger. The three components may be transmitted using Internet protocol (IP) multicast to the receivers. An IP multicast standard is described in Request for Comment (RFC 1301) entitled "Multicast Transport Protocol". RFCs may be available at web site address http://www.ietf.org/rfc.html.

Generally, an ATVEF announcement indicates an enhancement data is being transmitted and a resource includes one or more files that contain the enhancement data and a trigger synchronizes the enhancement data with the TV transmission. An announcement may describe the location of both the resource stream and the trigger stream. For each television channel, one or more enhancements may be offered as choices presented to the user, who can select which of the enhancements, if any, to view. The ATVEF Specification uses a one-way transmission protocol (the Unidirectional Hypertext Transfer Protocol or UHTTP described in the ATVEF Specification) to deliver resource data.

In one embodiment of the invention, the announcements, resources and triggers associated with an A/V channel may be delivered at about the same time as, and with the transmission of, the A/V content on that channel. Alternatively, ancillary data may be transmitted separately for subsequent association with the A/V content. Conventionally, for each enhancement, the resource stream may be delivered along with the announcement, with the resource stream stored locally in the receiver 16. If a viewer so desires, the enhancement data may be retrieved at the receiver from local storage for viewing.

In accordance with one embodiment of the present invention, the enhancement data stream includes not only conventional enhancement data, but also viewer loyalty incentives 17. The term "viewer loyalty incentive" refers to any information which is transmitted to the receiver to reward the viewer for continuously viewing a given program, commercial or series of programs. Generally, such incentives accumulate so that the more time the viewer continuously watches a given transmission, the greater the viewer loyalty incentive.

The incentives may include coupons for discounted products, games, stickers, trading cards, video clips, pictures, music, audio material, and textual material as examples.

Figure 2:
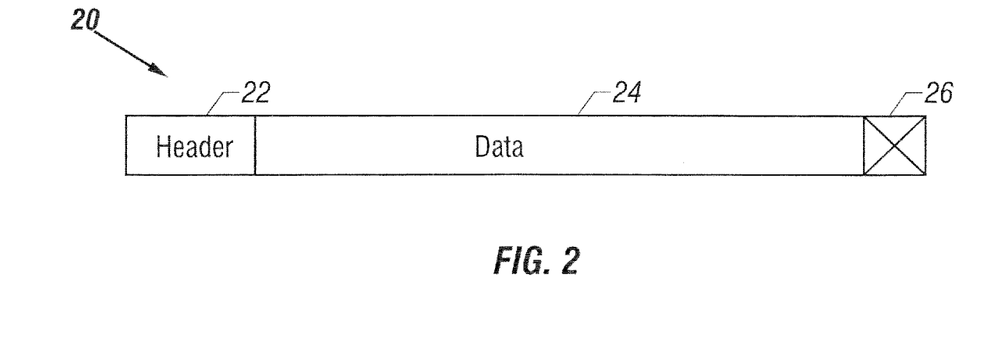
FIG. 2 is a schematic depiction of a data packet for the system shown in FIG. 1.

Referring next to FIG. 2, the transmitted packet information 20 may include a header 22, data 24 and a incentive portion 26. The incentive portion 26 may include the information making up all or part of an incentive. Thus, a plurality of such packets 20 may be necessary to accumulate enough information to create the entire incentive. In such case, if the viewer only receives a number of packets less than the entire set, the viewer may not receive enough information to make a useful incentive.

Figure 4:
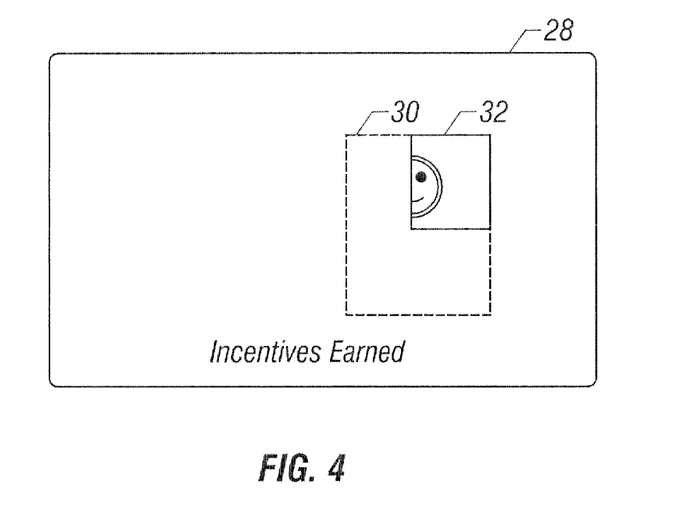
FIG. 4 is a depiction of a display screen showing a graphical user interface in accordance with one embodiment of the present invention.

As one example, an electronic coupon or collecting card may be provided, but unless the viewer receives a plurality of packets 20 only a portion of the overall award may be available. Thus, referring to FIG. 4, a display 28 may be provided in which the entire incentive, indicated at 30, may be shown in dotted lines. However, if the viewer did not view the entire subject matter which is associated with the coupon or incentive, the viewer may receive only a portion of the overall incentive 30. In some embodiments of the present invention, that portion may be useless. In such case, the viewer may be required to receive a number of packets 20 sufficient to create the entire incentive.

Figure 3:
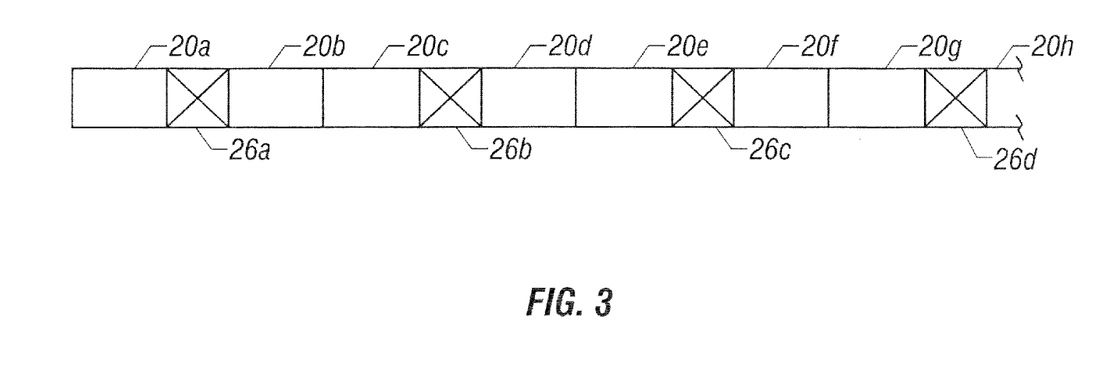
FIG. 3 is a schematic depiction of a plurality of data packets for a system of the type shown in FIG. 1 that make up a given television transmission.

Referring to FIG. 3, as a hypothetical example, the entire transmission which must be viewed to receive the incentive, is indicated as series of packets 20a through 20h. Every other packet may include a portion 26 of the overall incentive. When the viewer receives enough of the transmission to collect all four incentive portions 26a through 26d, the viewer may then be able to access the entire coupon or incentive.

The viewer may be provided with software on the viewer's system which enables the viewer to display the incentives earned so far. Thus, in this example, the entire incentive may be indicated at 30 but a viewer only having received a quarter of the necessary incentive portions 26 may see a display of only a quarter of the overall incentive as indicated at 32.

Figure 5:
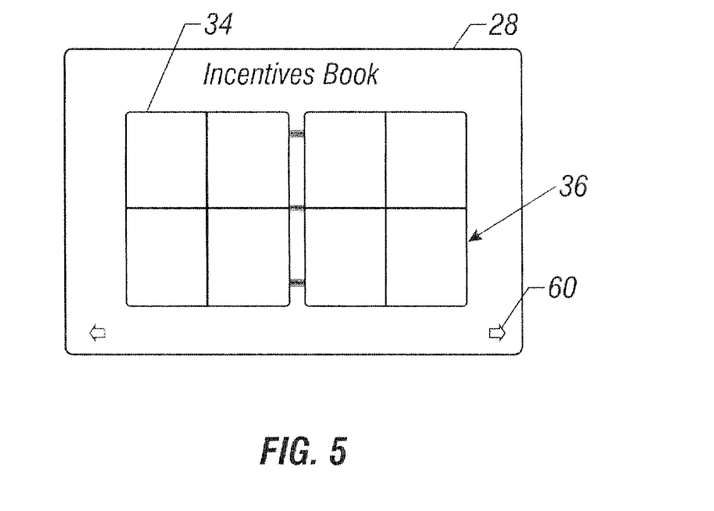
FIG. 5 is a depiction of a display screen showing another graphical user interface in accordance with an embodiment of the present invention.

In one embodiment of the present invention, electronic collecting cards may be progressively received by continuous loyalty to a given program, transmission or series of programs. The user may progressively receive a number of electronic cards, each provided in the form of an image download. These image downloads 34 may be collected into a display book 28. Thus, the user may be treated to a graphical user interface display which includes a series of pages 36 each including a number of trading cards 34 which have been downloaded as incentives for viewer loyalty.

Figure 6:
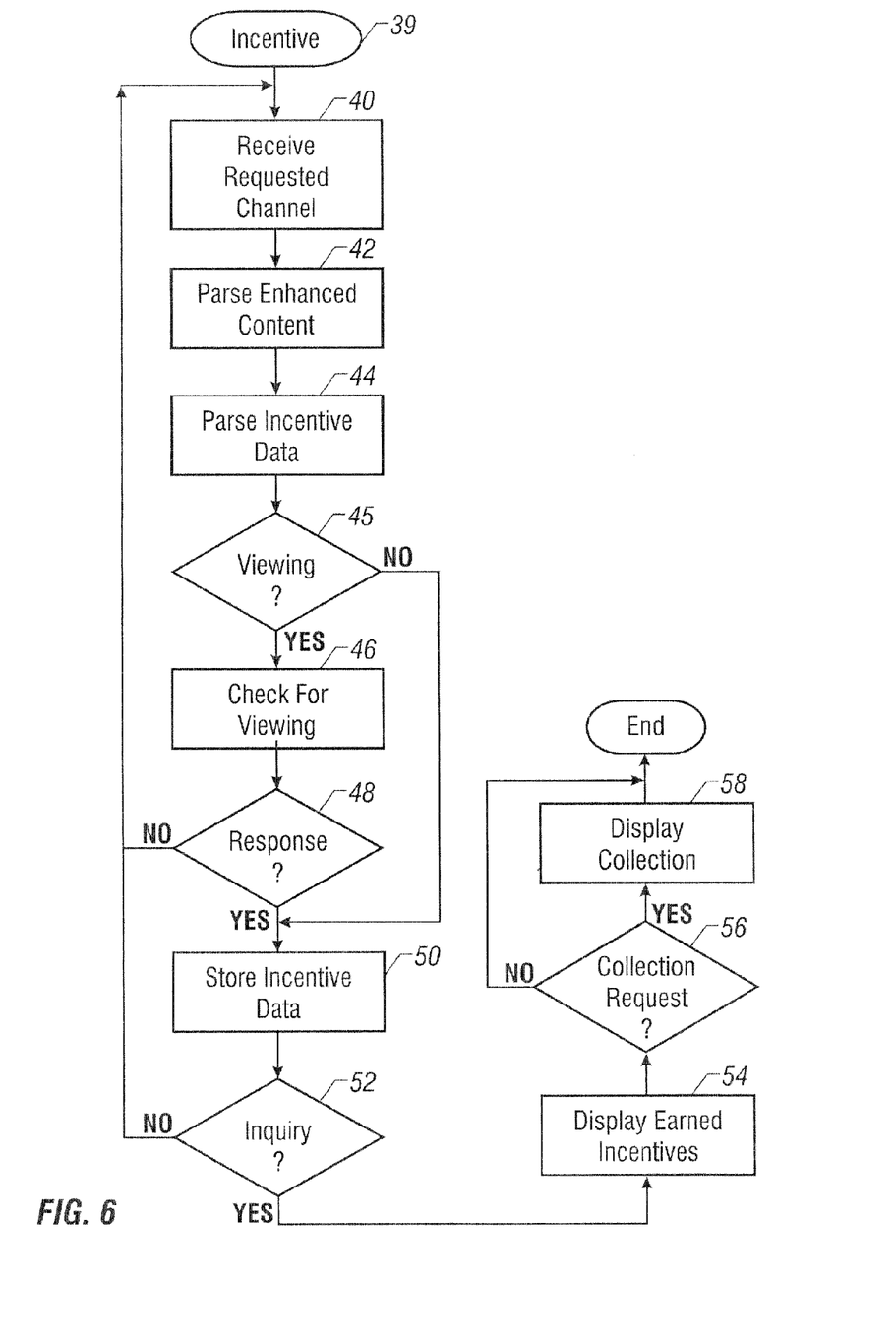
FIG. 6 is a flow chart for software for implementing on embodiment of the present invention.

Referring to FIG. 6, the incentive software 39 may be associated with the receiver 16 and a incentive storage 18. The incentive storage 18 may include the software or script which may be downloaded from the transmitter to the receiver and may further include stored information parsed from the transport 14 and associated with the coupon or incentive feature.

Initially, the receiver 16 software 39 determines whether a channel has been requested as indicated at 40. If so, the system tunes to that particular channel and the multiplexed data is received from the transmitter. The system parses the enhanced content from the television content if the enhanced content and television content are transmitted together, as indicated in block 42. Thereafter, within the enhanced content, the coupon or incentive data may be further parsed as indicated in block 44.

In order to prevent a user from simply leaving the television tuned to a particular program, the viewer may be asked to respond to an inquiry. For example, the viewer may be asked to provide an input in response to a question on the screen as indicated in block 46. If the viewer fails to respond, the flow cycles back to the beginning without storing the incentive data that has been received. If this feature is not desired (as determined at diamond 45) it may be bypassed.

Conversely, if the viewer responds to the inquiry, the incentive data may then be stored and is effectively earned by the viewer. Thereafter, the viewer may make an inquiry for status information as indicated in diamond 52. In such case, as indicated in 54, the viewer may be provided with the display of the type shown in FIG. 4. Absent an inquiry for such a display, the flow may recycle back to the beginning.

In addition, the viewer may request the overall status of all the incentives that have been received as indicated in diamond 56. In such case, the user may receive a display of the collection of incentives the viewer has received as indicated in block 58. For example, a incentive book or a collection of trading cards may be displayed in a graphical user interface which operates like a book. The user may turn from page to page by clicking on an appropriate icon as indicated at 60 and 62 so that the viewer may page, page by page, through the incentive book.

In one embodiment of the present invention, all of the available incentives may be initially displayed in a faint form. When the viewer receives the particular incentive, it may then be highlighted in a full color detailed display. Thus, the viewer can determine which incentives have not yet been earned and may seek to obtain them by viewing the appropriate content.

In still another embodiment of the present invention, incentive information may be in the form of a key. When sufficient information is provided to activate the key, the key may be utilized as a credit to make on-line purchase selections. The keys may be utilized either for discounts or to receive free products. These products may be actual products that may be sent to the viewer or may be in the form of electronic downloads of information.

Figure 7:
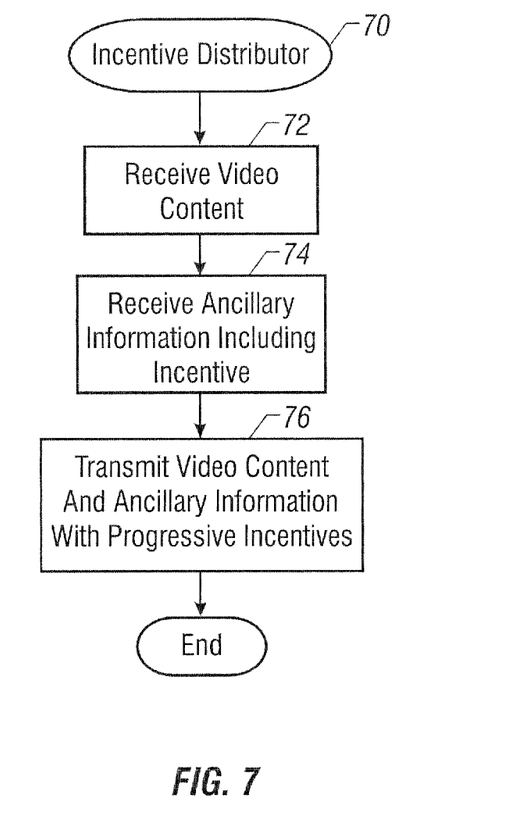
FIG. 7 is a flow chart for software resident on the transmitter in according with one embodiment of the invention.

Referring to FIG. 7, the incentive distribution software 70 begins by receiving video content, as indicated in block 72, from a content provider. Ancillary information including the viewer loyalty incentive is also received as indicated in block 74. The video content and the ancillary information is then transmitted either in combination or at separate times as indicated in block 76. The viewer loyalty incentives may be transmitted progressively so that as viewers continue to watch programs, they receive more incentives.

In one embodiment of the present invention, the control of storage of the incentives is on the receiving unit, the same control may be provided from the transmitter. That is, the transmitter may, for example through a back channel, receive information about the viewer's inattentiveness. If the viewer is no longer actually present, the transmitter may stop transmitting the viewer incentives in accordance with one embodiment of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   displaying a plurality of television segments available for viewing by a user;
   associating with each of said plurality of television segments a distinct viewing incentive that may be earned automatically by viewing each of said segments;
   using a computer processor to visually indicate an award that may be earned by viewing each of said segments and earning said distinct incentives for viewing each of said segments;
   determining whether the user has viewed one of said segments;
   if said user has viewed one of said segments, displaying a first visual depiction of an incentive associated with said segment that was earned and displaying a second visual depiction of additional incentives that must be earned to obtain an award, said first and second visual depictions being different so as to indicate whether the incentive is earned or unearned;
   determining whether the user qualifies for the award by viewing each of said segments and earning each incentive; and
   if said user qualifies for said award, providing for a download that signifies that the award is available to the user.

2. The method of claim 1 wherein displaying said segments includes displaying commercials.

3. The method of claim 1 including transmitting video programming together with ancillary information and transmitting said visual indication of an award as part of said ancillary information.

4. The method of claim 3 further including parsing enhanced content from the video content and parsing an incentive from said enhanced content.

5. The method of claim 1 wherein displaying an indication that an incentive was earned includes progressively providing a portion of the award.

6. The method of claim 5 including showing the portion of the award which has not yet been earned.

7. The method of claim 1 further including progressively providing incentives which may be collected in a graphical user interface for display.

8. The method of claim 7 including progressively adding incentives to a graphical user interface which may be viewed in a virtual book of pages of incentives.

9. The method of claim 8 including enabling the pages to appear to be turned by operating graphical user interface.

10. The method of claim 1 further including determining whether a viewer is actually viewing the video content.

11. A non-transitory computer readable medium storing instructions executable on a processor-based system to:
    display a plurality of television segments available for viewing by a user;
    associate with each of said plurality of television segments a distinct viewing incentive that may be earned by viewing each of said segments;
    visually indicate an award that may be earned by viewing each of said segments and earning said distinct incentives for viewing each of said segments;
    determine whether the user has viewed one of said segments;
    if said user has viewed one of said segments, display a first visual depiction of an incentive associated with said segment that was earned and displaying a second visual depiction of additional incentives that must be earned to obtain an award, said first and second visual depictions being different so as to indicate whether the incentive is earned or unearned;
    determine whether the user qualifies for the award by viewing each of said segments and earning each incentive; and
    if said user qualifies for said award, provide for a download that signifies that the award is available to the user.

12. The medium of claim 11 further storing instructions to display commercials.

13. The medium of claim 11 further storing instructions to transmit video programming together with ancillary information and transmitting said visual indication of an award as part of said ancillary information.

14. The medium of claim 13 further storing instructions to parse enhanced content from the video content and parsing an incentive from said enhanced content.

15. The medium of claim 11 further storing instructions to progressively provide a portion of the award.

16. The medium of claim 15 further storing instructions to show the portion of the award which has not yet been earned.

17. The medium of claim 11 further storing instructions to progressively provide incentives which may be collected in a graphical user interface for display.

18. The medium of claim 17 further storing instructions to progressively add incentives to a graphical user interface which may be viewed in a virtual book of pages of incentives.

19. The medium of claim 18 further storing instructions to enable the pages to appear to be turned by operating graphical user interface.

20. The medium of claim 11 further storing instructions to determine whether a viewer is actually viewing the video content.

21. An apparatus comprising:
a processor to:
- display a plurality of television segments available for viewing by a user;
- associate with each of said plurality of television segments a distinct viewing incentive that may be earned automatically by viewing each of said segments;
- visually indicate an award that may be earned by viewing each of said segments and earning said distinct incentives for viewing each of said segments;
- determine whether the user has viewed one of said segments;
- if said user has viewed one of said segments, display a first visual depiction of an incentive associated with said segment that was earned and displaying a second visual depiction of additional incentives that must be earned to obtain an award, said first and second visual depictions being different so as to indicate whether the incentive is earned or unearned;
- determine whether the user qualifies for the award by viewing each of said segments and earning each incentive; and
- if said user qualifies for said award, provide for a download that signifies that the award is available to the user; and a memory coupled to said processor.

22. The apparatus of claim 21, said processor to display commercials.

23. The apparatus of claim 21, said processor to transmit video programming together with ancillary information and transmitting said visual indication of an award as part of said ancillary information.

24. The apparatus of claim 23, said processor to parse enhanced content from the video content and parsing an incentive from said enhanced content.

25. The apparatus of claim 21, said processor further storing instructions to progressively provide a portion of the award.

26. The apparatus of claim 25, said processor to show the portion of the award which has not yet been earned.

27. The apparatus of claim 21, said processor to progressively provide incentives which may be collected in a graphical user interface for display.

28. The apparatus of claim 27, said processor to progressively add incentives to a graphical user interface which may be viewed in a virtual book of pages of incentives.

29. The apparatus of claim 28, said processor to enable the pages to appear to be turned by operating graphical user interface.

30. The apparatus of claim 21, said processor to determine whether a viewer is actually viewing the video content.

* * * * *